US008869181B2

(12) United States Patent
Ku et al.

(10) Patent No.: US 8,869,181 B2
(45) Date of Patent: Oct. 21, 2014

(54) METHOD AND SYSTEM FOR MESSAGE NOTIFICATION

(75) Inventors: Bernard Ku, Austin, TX (US); Arshad Khan, Austin, TX (US); Niral Sheth, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1887 days.

(21) Appl. No.: 11/863,652

(22) Filed: Sep. 28, 2007

(65) Prior Publication Data

US 2009/0089188 A1   Apr. 2, 2009

(51) Int. Cl.
| | |
|---|---|
| H04N 7/16 | (2011.01) |
| H04N 21/258 | (2011.01) |
| G06Q 10/10 | (2012.01) |
| H04N 21/4788 | (2011.01) |
| G06Q 40/00 | (2012.01) |
| H04N 21/2543 | (2011.01) |
| H04N 21/2743 | (2011.01) |
| H04N 7/173 | (2011.01) |

(52) U.S. Cl.
CPC ..... *H04N 7/17309* (2013.01); *H04N 21/25816* (2013.01); *G06Q 10/107* (2013.01); *H04N 21/4788* (2013.01); *G06Q 40/12* (2013.01); *H04N 21/2543* (2013.01); *H04N 21/2743* (2013.01)
USPC .................................. 725/1; 725/5

(58) Field of Classification Search
USPC ........................... 725/46, 106, 1, 5
See application file for complete search history.

(56) References Cited

U.S. PATENT DOCUMENTS

| | | | |
|---|---|---|---|
| 6,801,261 B1 | 10/2004 | Haynes | |
| 7,061,371 B2 | 6/2006 | Shockley | |
| 7,176,794 B2 | 2/2007 | Fairhurst et al. | |
| 2002/0047892 A1* | 4/2002 | Gonsalves, Jr. | 348/14.06 |
| 2003/0121036 A1 | 6/2003 | Lock et al. | |
| 2003/0226143 A1 | 12/2003 | Michael et al. | |
| 2005/0149967 A1 | 7/2005 | Hanley et al. | |
| 2005/0154769 A1* | 7/2005 | Eckart et al. | 707/201 |
| 2005/0165849 A1* | 7/2005 | Moradi et al. | 707/104.1 |
| 2006/0140169 A1 | 6/2006 | Soundararajan | |
| 2007/0118861 A1 | 5/2007 | Stone | |
| 2007/0124795 A1* | 5/2007 | McKissick et al. | 725/135 |
| 2007/0136743 A1 | 6/2007 | Hasek et al. | |
| 2007/0136777 A1 | 6/2007 | Hasek et al. | |

OTHER PUBLICATIONS

Cotriss, David , "Daily IPTV—Raketu's All in One IPTV Box", http://www.dailyiptv.com/features/raketu-all-in-one-iptv-box-073107/, (Webpage downloaded Sep. 8, 2007), 3 pgs.

* cited by examiner

*Primary Examiner* — Nasser Goodarzi
*Assistant Examiner* — Michael Hong
(74) *Attorney, Agent, or Firm* — Guntin & Gust, PLC; Joseph P. Hrutka

(57) ABSTRACT

Methods and systems for message notification are described. A video message is received from a source access device. A selection of a target user may be received for the video message. A message notification of availability of the video message for a target access device associated with the target user may be provided.

25 Claims, 19 Drawing Sheets

METHOD AND SYSTEM FOR MESSAGE NOTIFICATION

FIELD

This application relates to a method and system for network delivery of media content, and more specifically to methods and systems for messaging.

BACKGROUND

Sending messages with a selected media clip to authorized users over a network may involve issues of user authorization to receive the information as well as issues relating to whether the user desires to receive the media clip.

BRIEF DESCRIPTION OF DRAWINGS

Embodiments are illustrated by way of example and not limitation in the figures of the accompanying drawings, in which like references indicate similar elements and in which.

DETAILED DESCRIPTION

Example methods and systems for message notification are described. In the following description, for purposes of explanation, numerous specific details are set forth in order to provide a thorough understanding of example embodiments. It will be evident, however, to one skilled in the art that the present invention may be practiced without these specific details.

In an example embodiment, a video message may be received from a source access device. A designation of a target user for the video message may be received. A message notification of availability of the video message for a target access device associated with a target user may be provided to the target user.

In an example embodiment, a selection of a video message may be received. The selected video message may be uploaded to a messenger. A designation of a target user for the selected video message may be received from a sender. A message notification of availability of the selected video message for an access device associated with the target user may be provided.

In an example embodiment, a message notification associated with a video message on an access device may be received. A plurality of viewing selections associated with the video message may be provided for selection through the access device. A viewing selection of the plurality of viewing selections may be accessed for the video message. A message viewing request may be provided to the messenger based on the receipt of the viewing selection. The video message may be received from the messenger in response to the providing of the message viewing request.

Figure 1:
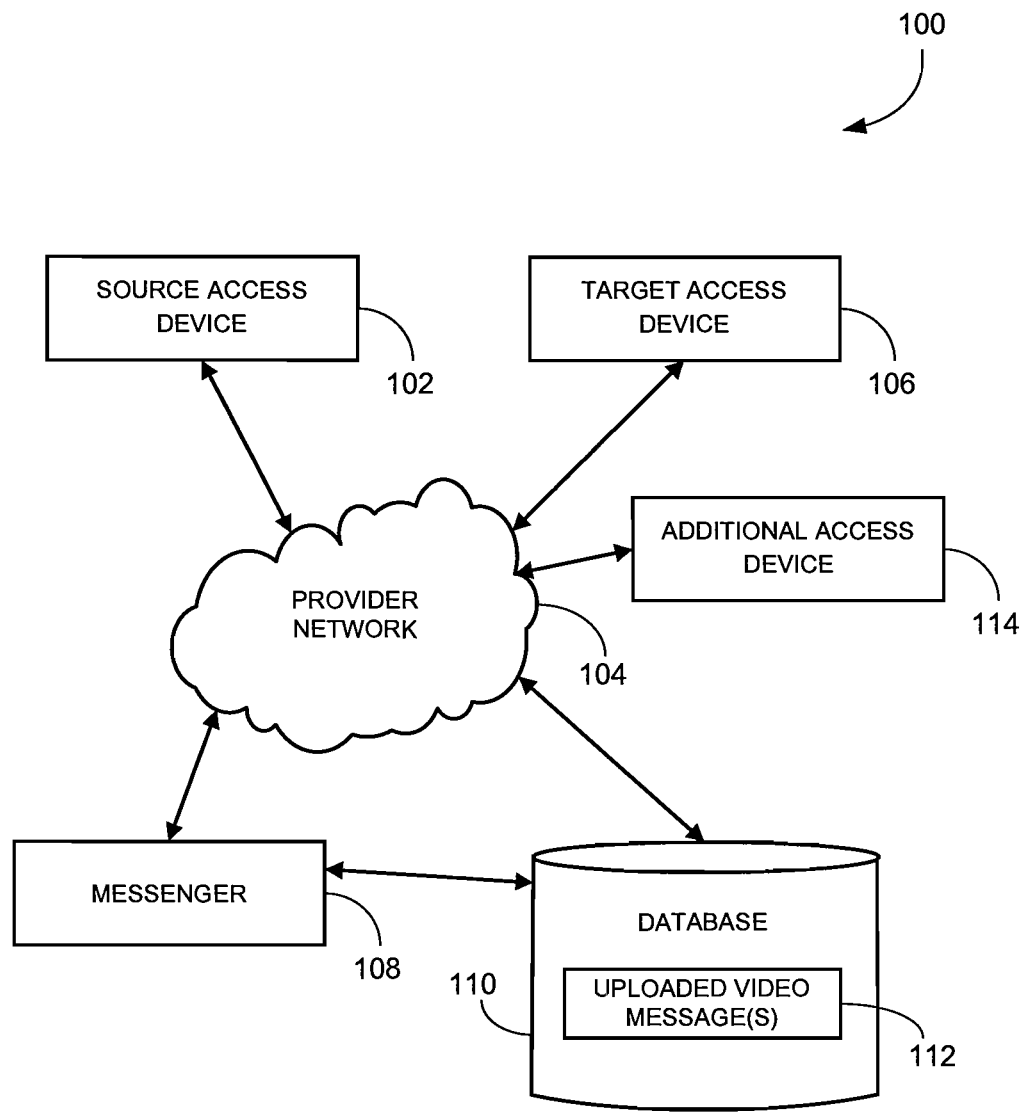
FIG. 1 is a block diagram of an example content system according to an example embodiment.

FIG. 1 illustrates an example content system 100. A source access device 102 may upload a video message to a messenger 108 over a provider network 104. The video message may be a sequence of images and one or more associated audio tracks. The video message may be provided in a high quality video stream (e.g., MPEG-4) that is transcoded by the messenger 108 (e.g., into H.264) for distribution to the access devices 106, 114. The video message may include standard definition (SD) or high definition (HD) video signals in NTSC (National Television System Committee), PAL (Phase Alternation Line), SECAM (Systeme Electronique Couleur Avec Memoire), sequence of bitmaps or other signal formats that transport a sequence of images. The form of the video message may be otherwise modified to enable implementations of various formats and resolutions.

The messenger 108 may enable distribution of the video message to one or more target users. The messenger 108 may save an uploaded video message 112 in memory or in the database 110. The messenger 108 may provide a message notification to a target access device 106. The video message may be streamed for viewing through the target access device 106 (e.g., on a display device associated with the target access device 106), saved on the target access device 106, or otherwise utilized. The message notification and/or the video message may be provided to an additional access device 114 associated with the user of the target access device 106.

The provider network 104 may be a television distribution network, Global System for Mobile Communications (GSM) network, an Internet Protocol (IP) network, a Wireless Application Protocol (WAP) network, and/or a WiFi network. Other networks may also be used.

Examples of the access devices 102, 106, 114 include a set-top box (STB), a receiver card, a mobile telephone, a personal digital assistant (PDA), a display device, a portable gaming unit, and a computing system; however other devices may also be used.

Figure 2:
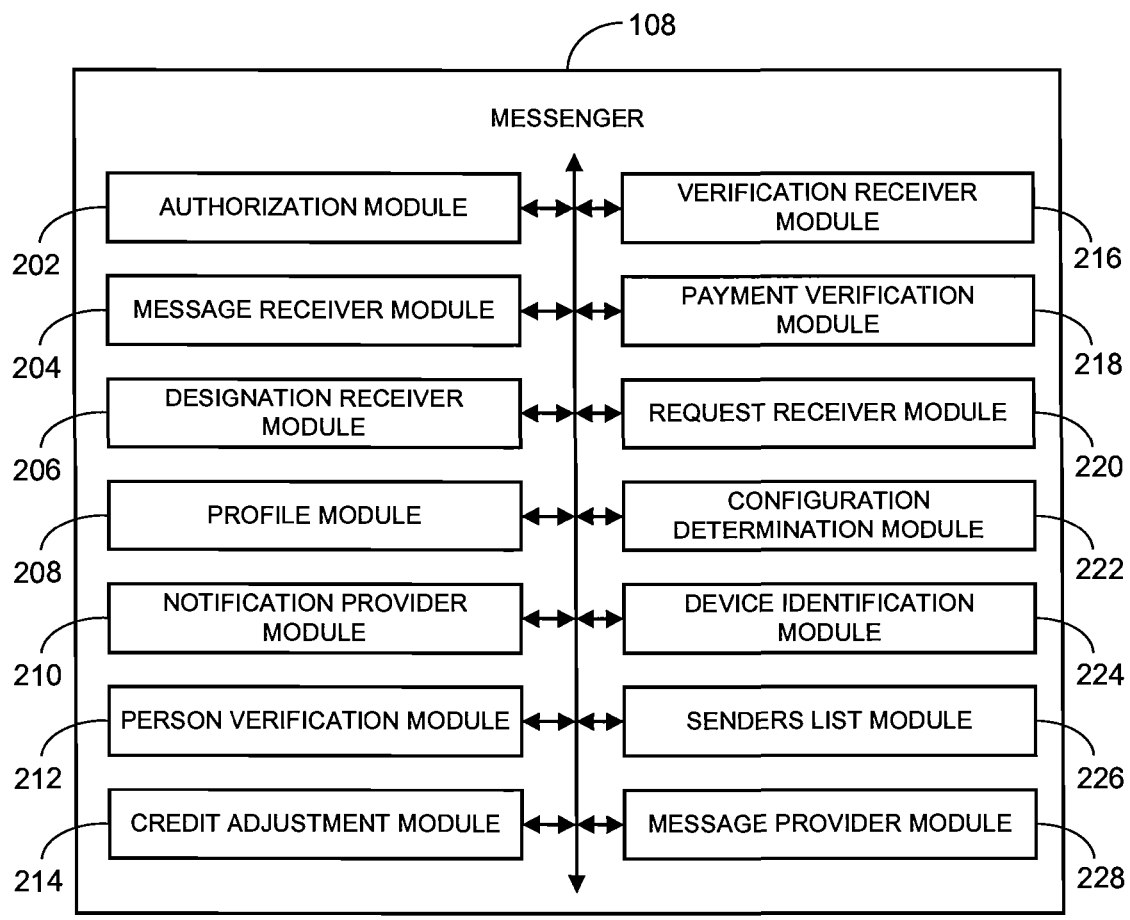
FIG. 2 is a block diagram of an example messenger that may be deployed in the content system of FIG. 1 according to an example embodiment.

FIG. 2 illustrates an example messenger 108 that may be deployed in the content system 100 (see FIG. 1) and/or another system.

The messenger 108 may include an authorization module 202, a message receiver module 204, a designation receiver module 206, a profile module 208, a notification provider module 210, a person verification module 212, a credit adjustment module 214, a verification receiver module 216, a payment verification module 218, a request receiver module 220, a configuration determination module 222, a device identification module 224, a senders list module 226, and/or a message provider module. Other modules may also be used.

The authorization module 202 receives an authorization request from the source access device 102, authorizes the source access device 102 to upload the video message, and/or provides an authorization to the source access device 102.

The message receiver module 204 receives a video message from the source access device 102. The designation receiver module 206 receives a designation of a target user for a video message.

The profile module 208 accesses a user profile associated with the target user of the target access device 106. The user profile may include a device selection of the target access device 106 from a number of access devices 300 associated with the target user.

The notification provider module 210 provides a message notification of availability of the video message to the target user for the target access device 106 associated with the target user. The message notification may be provided to the target access device 106 in accordance with the user profile.

The person verification module 212 verifies that a sender associated with the source access device 102 has sufficient credit to upload the video message and/or that the target user has sufficient credit to receive the selected video message. For example, the credit may be associated with a dollar amount for each video message uploaded and/or received, the credit may be associated with a subscription level, and/or the credit may be for video messages of a certain size. Other types of credit may also be used.

The credit adjustment module 214 adjusts credit of the sender based on the upload of the video message and/or the credit of the target user based on the providing of the video message.

The verification receiver module 216 receives a verification request from the sender. The payment verification module 218 provides payment verification in accordance with the adjusting of the credit of the sender performed by the credit adjustment module 214.

The request receiver module 220 receives a message viewing request and/or or a message download request from the target user of the message notification. The configuration determination module 222 determines a configuration of the target access device 106.

The device identification module 224 identifies the additional access device 114 associated with the target user. The senders list module 226 accesses a selected senders list associated with the target user and/or determines whether a sender of the video message is included on the selected senders list.

The message provider module 228 provides the video message to the target user. The video message may be streamed for viewing and/or provided for storage. The video message may be provided to the target access device 106 and/or the additional access device 114.

Figure 3:
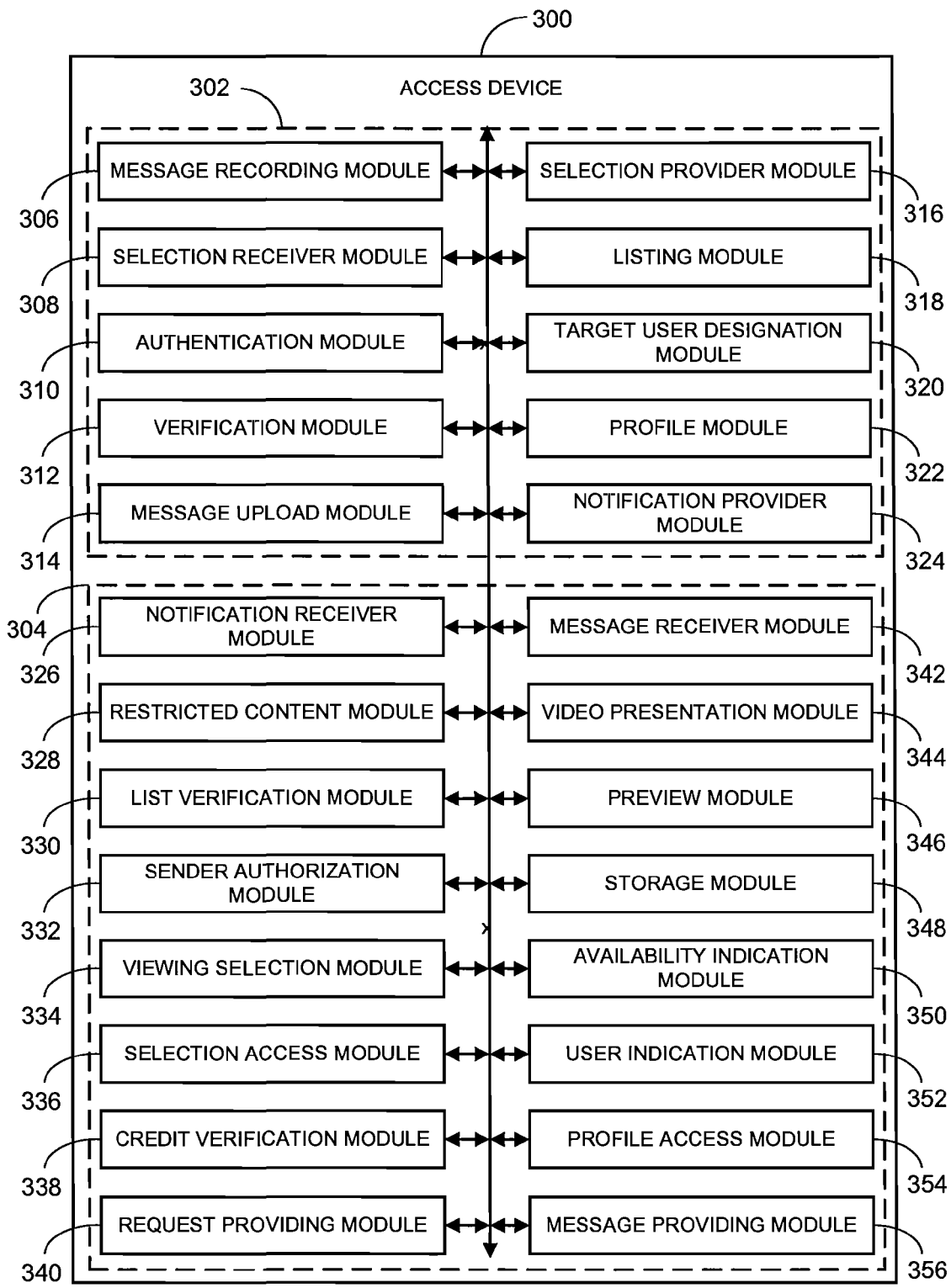
FIG. 3 is a block diagram of an example access device that may be deployed in the content system of FIG. 1 according to an example embodiment.

FIG. 3 illustrates an example access device 300 that may be deployed as the source access device 102, the target access device 106 and/or the additional access device 114 in the content system 100 (see FIG. 1) and/or another system.

The access device 300 may include a sending subsystem 302 and/or a receiving subsystem 304. Other subsystems may also be used.

The sending subsystem 302 may include a message recording module 306, a selection receiver module 308, an authentication module 310, a verification module 312, a message upload module 314, a selection provider module 316, a listing module 318, a target user designation module 320, a profile module 322, and/or a notification provider module 324. Other modules may also be used.

The message recording module 306 records one or more video messages through a camera interface on the source access device 102. The selection receiver module 308 receives a selection of a selected video message.

The authentication module 310 provides an authorization request to authorize the sender to upload the selected video message and/or receives an authorization confirmation in response to the authorization request.

The verification module 312 provides a verification request to verify that a sender has sufficient credit to upload the selected video message and/or receives payment verification in response to the verification request The message upload module 314 uploads the selected video message to the messenger 108. The uploading of the selected video message to the messenger 108 may be based on the receiving of the authorization confirmation from the authentication module 310 and/or payment verification from the verification module 312.

The selection provider module 316 provides a number of video messages associated with a user account for selection. The listing module 318 provides a buddy list for presentation. The buddy list may include a number of target users.

The target user designation module 320 receives a designation of a target user for the selected video message from a sender. The designation of the target user may be from the buddy list. The profile module 322 accesses a user profile associated with a user of the source access device 102.

The notification provider module 324 provides a message notification of availability of the selected video message for the target access device 106. The message notification may be provided to a selected device (e.g., the target access device 106 and/or the additional access device 114) based on the user profile.

The receiving subsystem 304 may include a notification receiver module 326, a restricted content module 328, a list verification module 330, a sender authorization module 332, a viewing selection module 334, a selection access module 336, a credit verification module 338, a request providing module 340, a message receiver module 342, a video presentation module 344, a preview module 346, a storage module 348, an availability indication module 350, a user indication module 352, a profile access module 354, and/or a message providing module 356. Other modules may also be used.

The notification receiver module 326 receives a message notification associated with a video message on the target access device 106. The restricted content module 328 determines whether the video message contains restricted content.

The list verification module 330 verifies that a sender of the video message is on an approved senders list associated with the target user. The sender authorization module 332 notifies an additional user regarding the message notification and/or receives a sender authorization from the additional user.

The viewing selection module 334 provides a number of viewing selections associated with the video message for selection through the target access device 106. The providing of the viewing selections may be in accordance with the determining of the restricted content by the restricted content module 328, the verifying of the sender by the list verification module 330, and/or the receiving of the sender authorization by the sender authorization module 332.

The selection access module 336 accesses a viewing selection of a number of viewing selections for the video message.

The credit verification module 338 provides a verification request to verify that a target user has sufficient credit to receive the video message and/or receives payment verification in response to the verification request.

The request providing module 340 provides a message viewing request to the messenger 108 based on the receiving of the viewing selection. The providing of the message viewing request to the messenger 108 may be based on the payment verification performed by the credit verification module 338.

The message receiver module 342 receives the video message from the messenger in response to the providing of the message viewing request. The video presentation module 344 provides the video message for presentation.

The preview module 346 generates a preview of the video message and/or provides the preview of the video message for presentation. The storage module 348 stores the video message on the target access device 106.

The availability indication module 350 adds an availability indication of the video message to a digital video recorder (DVR) content list and/or links the availability indication to the video message stored on the access device. The user indication module 352 provides a user indication on the target access device 106 from the receipt of the message notification.

The profile access module 354 accesses a user profile associated with a user of the target access device 106. The message providing module 356 provides a message notification over the provider network 104 to the additional access device 114 associated with the user in accordance with the user profile. The user profile may be stored in the target access device 106, in the messenger 108, in the database 110, or otherwise stored.

Figure 4:
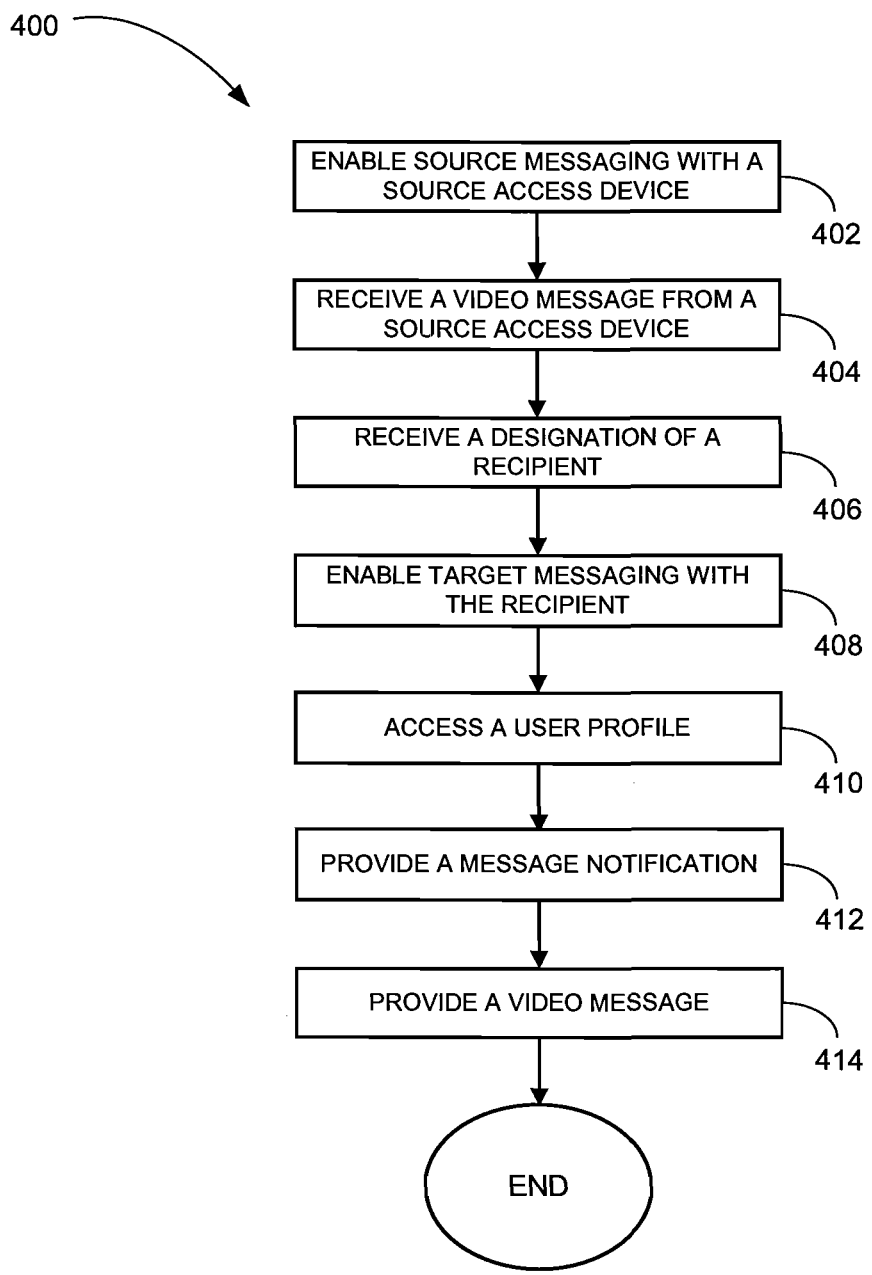
FIG. 4 is a flowchart illustrating a method for message notification in accordance with an example embodiment.

FIG. 4 illustrates a method 400 for message notification according to an example embodiment. The method 400 may be performed by the messenger 108 (see FIG. 1) of the content system 100 or otherwise performed.

Source messaging may be enabled with the source access device 102 at block 402. A video message is received from the source access device 102 at block 404. A selection of a target user for the video message is received at block 406. Target messaging may be enabled with the target user at block 408.

A user profile associated with the target user of the target access device 106 may be accessed at block 410. The user profile may include a device selection of the access device 300 (e.g., the target access device 106 or the additional access device 114) from a number of access devices 300 associated with the target user on which the video message should be received.

A message notification of availability of the video message for the target access device 106 associated with the target user is provided to the target user at block 412. The video message may be maintained so that it may be provided (e.g., streamed).

The video message may be provided to the target user at block 414. The video message may be provided when the target user has the sufficient credit or otherwise provided. The video message may be provided (e.g., to the selected access device 300) in accordance with the user profile.

Figure 5:
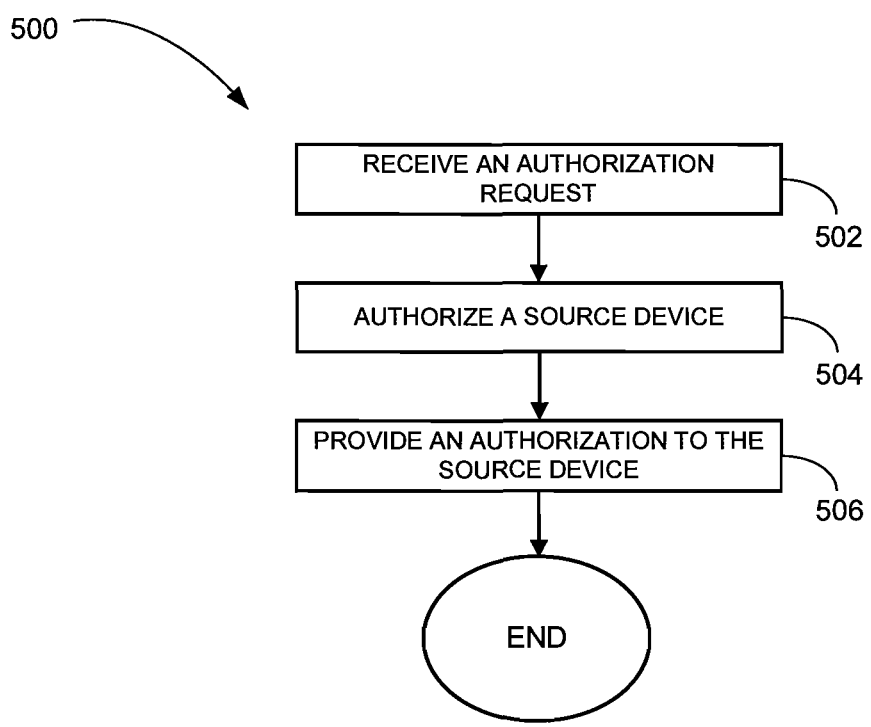
FIGS. 5 and 6 are flowcharts illustrating a method for enabling source messaging in accordance with an example embodiment.

FIG. 5 illustrates a method 500 for enabling source messaging according to an example embodiment. The method 500 may be performed at block 402 (see FIG. 4) or otherwise performed.

An authorization request is received from the source access device 102 at block 502. The source access device is authorized to upload the video message at block 504. An authorization is provided to the source access device 102 in accordance with the authorization of the source access device 102.

Figure 6:
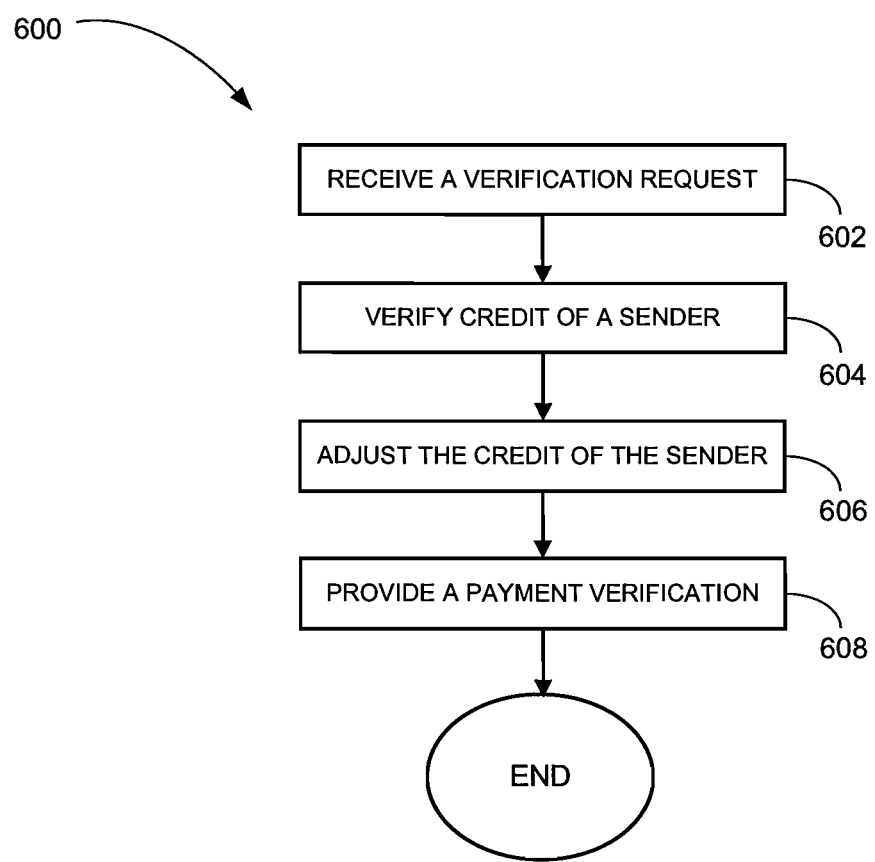

FIG. 6 illustrates a method 600 for enabling source messaging according to an example embodiment. The method 600 may be performed at block 402 (see FIG. 4) or otherwise performed.

A verification request may be received from the sender at block 602. At block 604, verification that a sender associated with the source access device 102 has sufficient credit to upload the video message is performed.

The credit of the sender is adjusted based on the upload of the video message at block 606. Payment verification may be provided in accordance with the adjusting of the credit of the sender at block 608.

Figure 7:
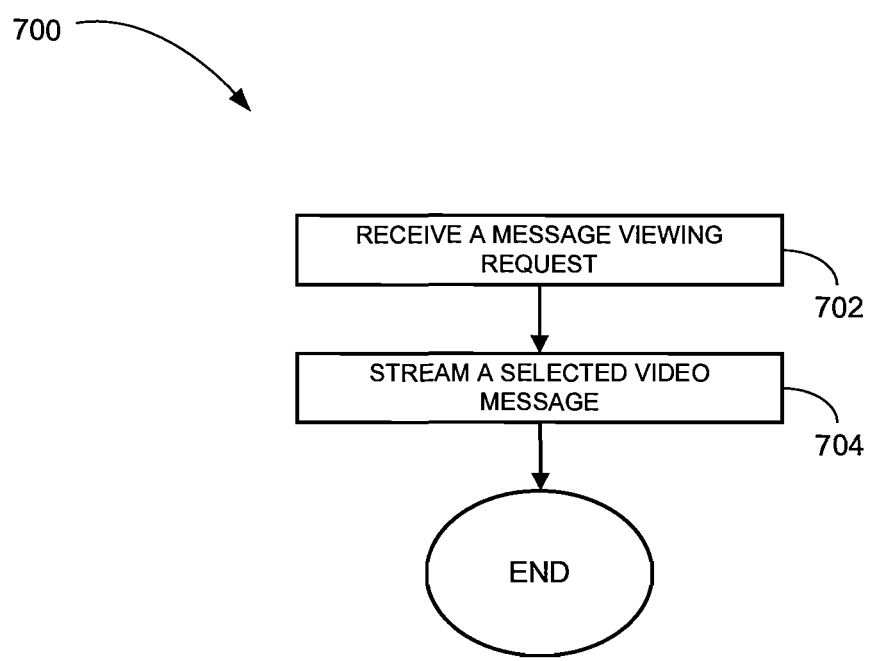
FIGS. 7 and 8 are flowcharts illustrating a method for providing a video message in accordance with an example embodiment.

FIG. 7 illustrates a method 700 for providing a video message according to an example embodiment. The method 700 may be performed at block 414 (see FIG. 4) or otherwise performed.

A message viewing request is received from the target user of the message notification at block 702. The selected video message is streamed for viewing at block 704. The selected video message may be streamed to the target access device 106, the additional device 114, and/or a different device.

Figure 8:
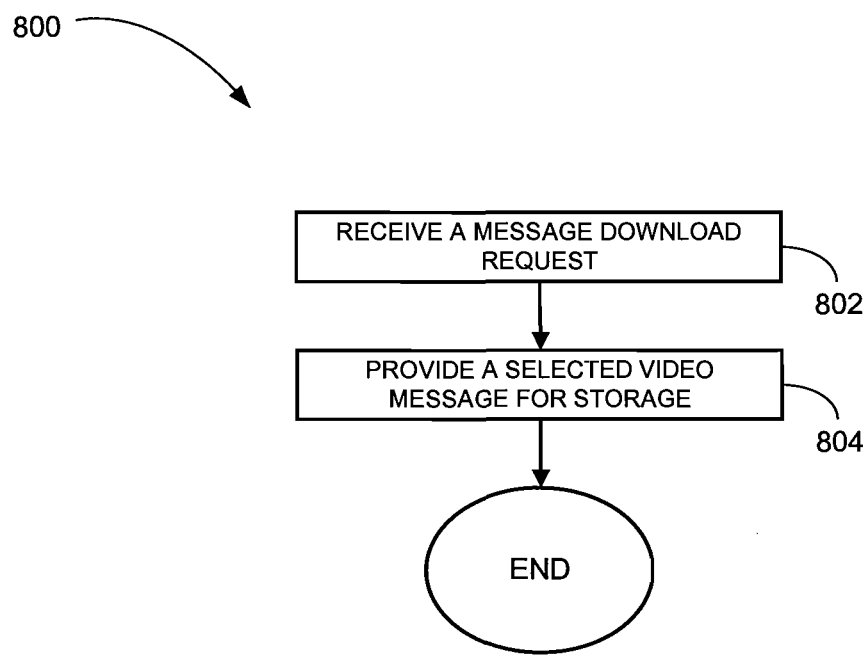

FIG. 8 illustrates a method 800 for providing a video message according to an example embodiment. The method 800 may be performed at block 414 (see FIG. 4) or otherwise performed.

A message download request is received from the target user of the message notification at block 802. The selected video message is provided for storage at block 804.

Figure 9:
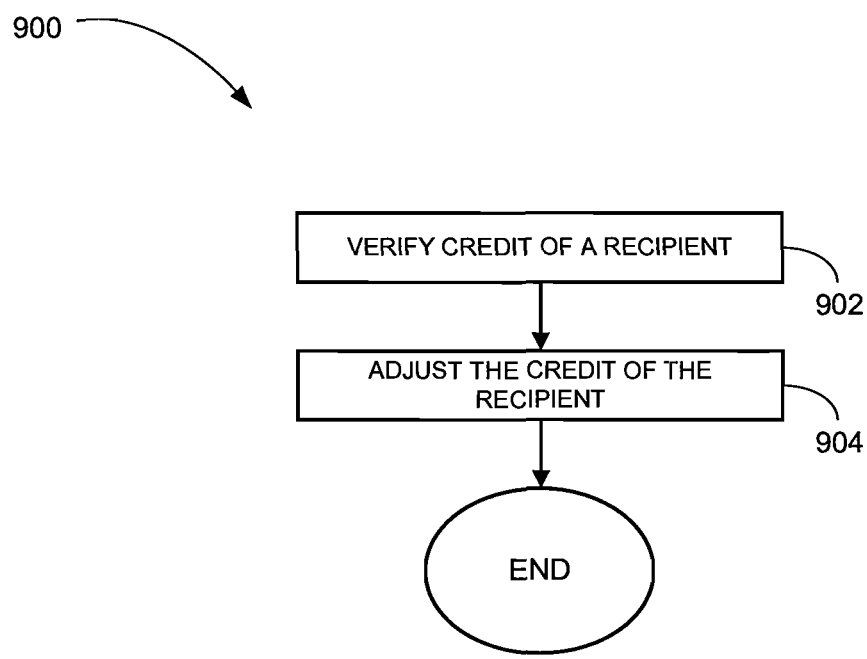
FIGS. 9-11 are flowcharts illustrating a method for enabling target messaging in accordance with an example embodiment.

FIG. 9 illustrates a method 900 for enabling target messaging according to an example embodiment. The method 900 may be performed at block 408 (see FIG. 4) or otherwise performed.

Verification that the target user has sufficient credit to receive the selected video message may be performed at block 902. Credit of the target user is adjusted based on the providing of the video message at block 904.

Figure 10:
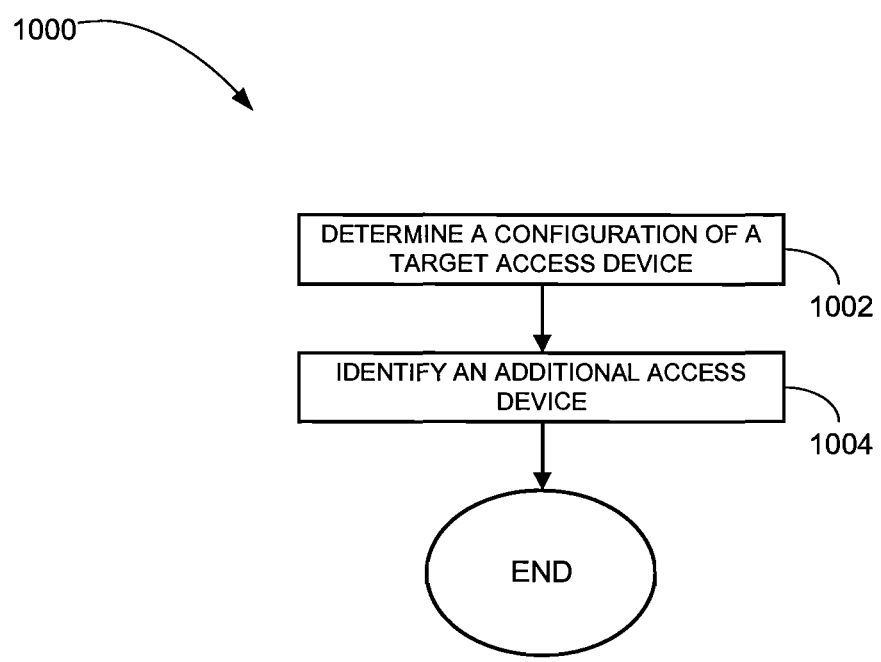

FIG. 10 illustrates a method 1000 for enabling target messaging according to an example embodiment. The method 1000 may be performed at block 408 (see FIG. 4) or otherwise performed.

A configuration of the target access device 106 is determined at block 1002. The additional access device 114 associated with the target user is identified at block 1004. The identification of the additional access may be used to determine the access devices 300 to which the video message is provided.

Figure 11:
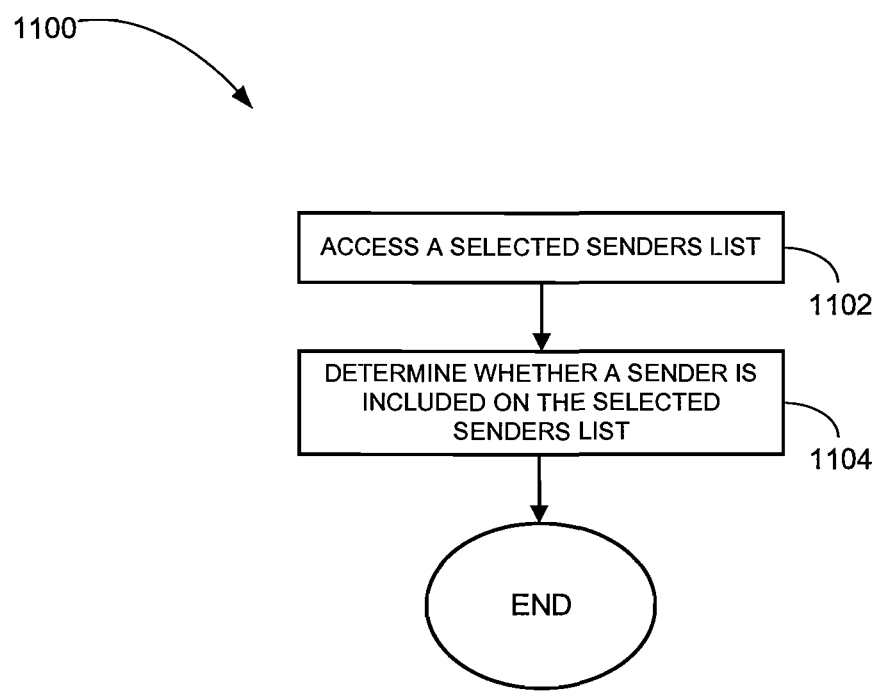

FIG. 11 illustrates a method 1100 for enabling target messaging according to an example embodiment. The method 1100 may be performed at block 408 (see FIG. 4) or otherwise performed.

A selected senders list associated with the target user is accessed at block 1102. The selected senders list may define the senders that have been approved to provide a video message to the target user on the additional access device 114.

At block 1104, a determination is made of whether a sender of the video message is included on the selected senders list. The determination may determine whether the video message is provided to the additional access device 114 at block 412 or otherwise retained on the target access device 106.

Figure 12:
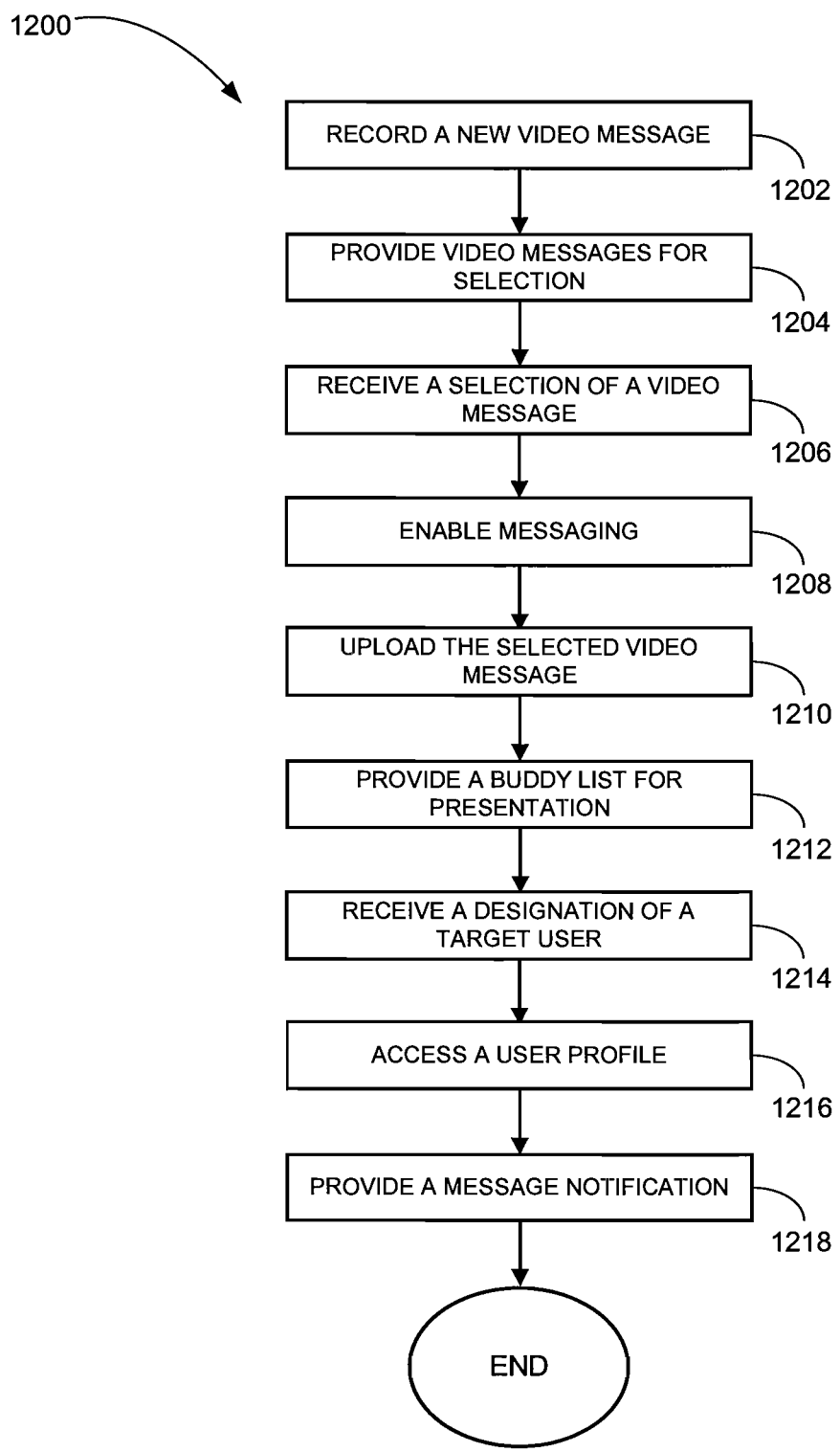
FIG. 12 is a flowchart illustrating a method for message notification in accordance with an example embodiment.

FIG. 12 illustrates a method 1200 for message notification according to an example embodiment. The method 1200 may be performed by the source access device 102 (see FIG. 1) of the content system 100 or otherwise performed.

A video message may be recorded at block 1202. The video message may be recorded through a camera interface on the source access device 102 of the sender or otherwise recorded.

At block 1204, one or more video messages associated with a user account of a sender may be provided for selection. A selection of a video message is received at block 1206.

Messaging may be enabled at block 1208. The selected video message is uploaded to the messenger 108 at block 1210.

A buddy list may be provided for presentation at block 1212. The buddy list may include potential target users of the video message.

A designation of a target user for the selected video message is received from a user at block 1214. The selection of the receipt may be made from the buddy list or otherwise made.

A user profile associated with a user of the source access device 102 may be accessed at block 1216. The user profile may indicate one or more access devices 300 (e.g., the target access device 106 and/or the additional access device 114) associated with the target user to which the video message should be sent.

At block 1218, a message notification of availability of the selected video message is provided for the target access device 106 associated with the target user.

Figure 13:
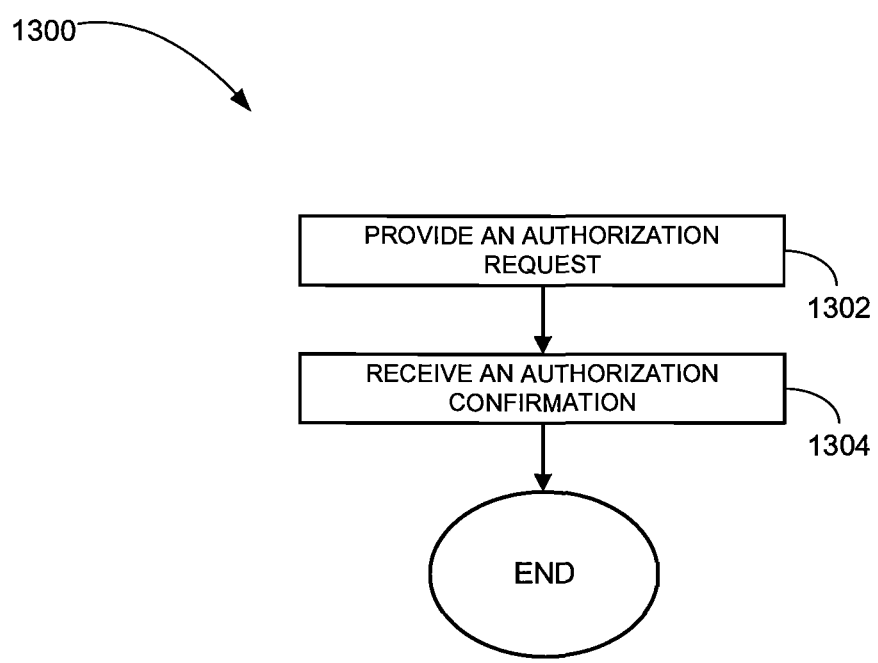
FIGS. 13 and 14 are flowcharts illustrating a method for enabling messaging in accordance with an example embodiment.

FIG. 13 illustrates a method 1300 for enabling messaging according to an example embodiment. The method 1300 may be performed at block 1208 (see FIG. 12) or otherwise performed.

An authorization request to authorize the sender to upload the selected video message is provided at block 1302.

An authorization confirmation is received in response to the authorization request at block 1304. The uploading of the selected video message to the messenger 108 performed during the operations at block 1210 (see FIG. 12) may based on the receiving of the authorization confirmation.

Figure 14:
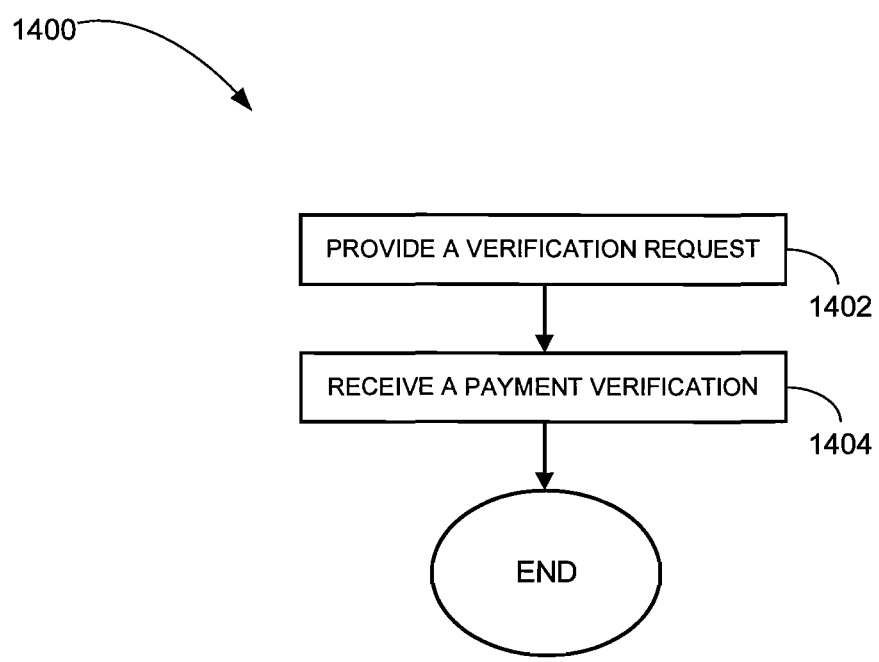

FIG. 14 illustrates a method 1400 for enabling messaging according to an example embodiment. The method 1400 may be performed at block 1208 (see FIG. 12) or otherwise performed.

At block 1402, a verification request is provided to verify that a sender has sufficient credit to upload the selected video message.

Payment verification is received in response to the verification request at block 1404. The uploading of the selected video message to the messenger 108 performed during the operations at block 1210 (see FIG. 12) may based on the received payment verification.

Figure 15:
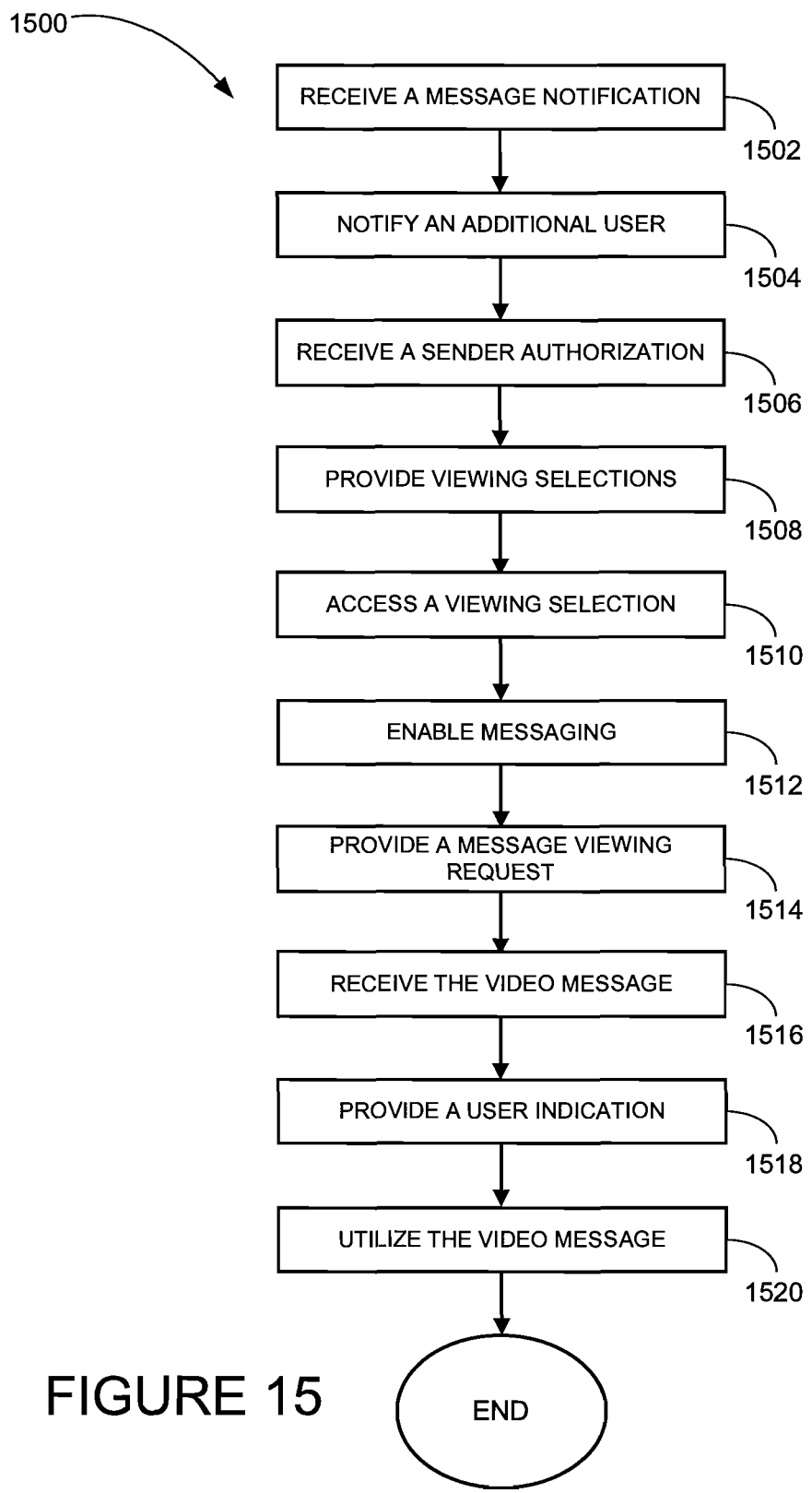
FIG. 15 is a flowchart illustrating a method for notification processing in accordance with an example embodiment.

FIG. 15 illustrates a method 1500 for notification processing according to an example embodiment. The method 1500 may be performed by the target access device 106 (see FIG. 1) of the content system 100 or otherwise performed.

At block 1502, a message notification associated with a video message is received on the target access device 106. An additional user may be notified regarding the message notification at block 1504. The additional user may be notified to seek approval for the user of the target access device 106 to receive the video message and/or utilize the video message. For example, the additional user may be a parent and the user may be a child.

A sender authorization from the additional user may be received from the additional user at block 1506. The additional user may provide the sender authorization to approve of the receiving of the video message and/or utilization of the video message by the user. If the sender authorization is not received, the video message may be unavailable for selection by the user.

At block 1508, a number of available viewing selections associated with the video message are provided for presentation through the target access device 106.

In an example embodiment, a determination of whether the video message contains restricted content may be made and the viewing selections may be made based on whether video message contains restricted content. The determination of the content restriction may be based on a provider rating of the video message, speech recognition performed on the video message, video recording performed on the video message, and the like.

In an example embodiment, a verification that a sender of the video message is on an approved senders list associated with the target user may be made and the viewing selections may be made based on the verification of the sender.

A viewing selection of the presented viewing selections is accessed for the video message at block at block 1510. The viewing selection may be stored on the target access device 106, receiving from the number of viewing selections, or otherwise accessed.

Messaging may be enabled at block 1512. A message viewing request is provided to the messenger 108 based on the received viewing selection at block at block 1514. At block 1516, the video message is received from the messenger 108 in response to the providing of the message viewing request.

A user indication may be provided on the target access device 106 to indicate the receipt of the message notification at block 1518. The video message may be utilized at block 1520.

Figure 16:
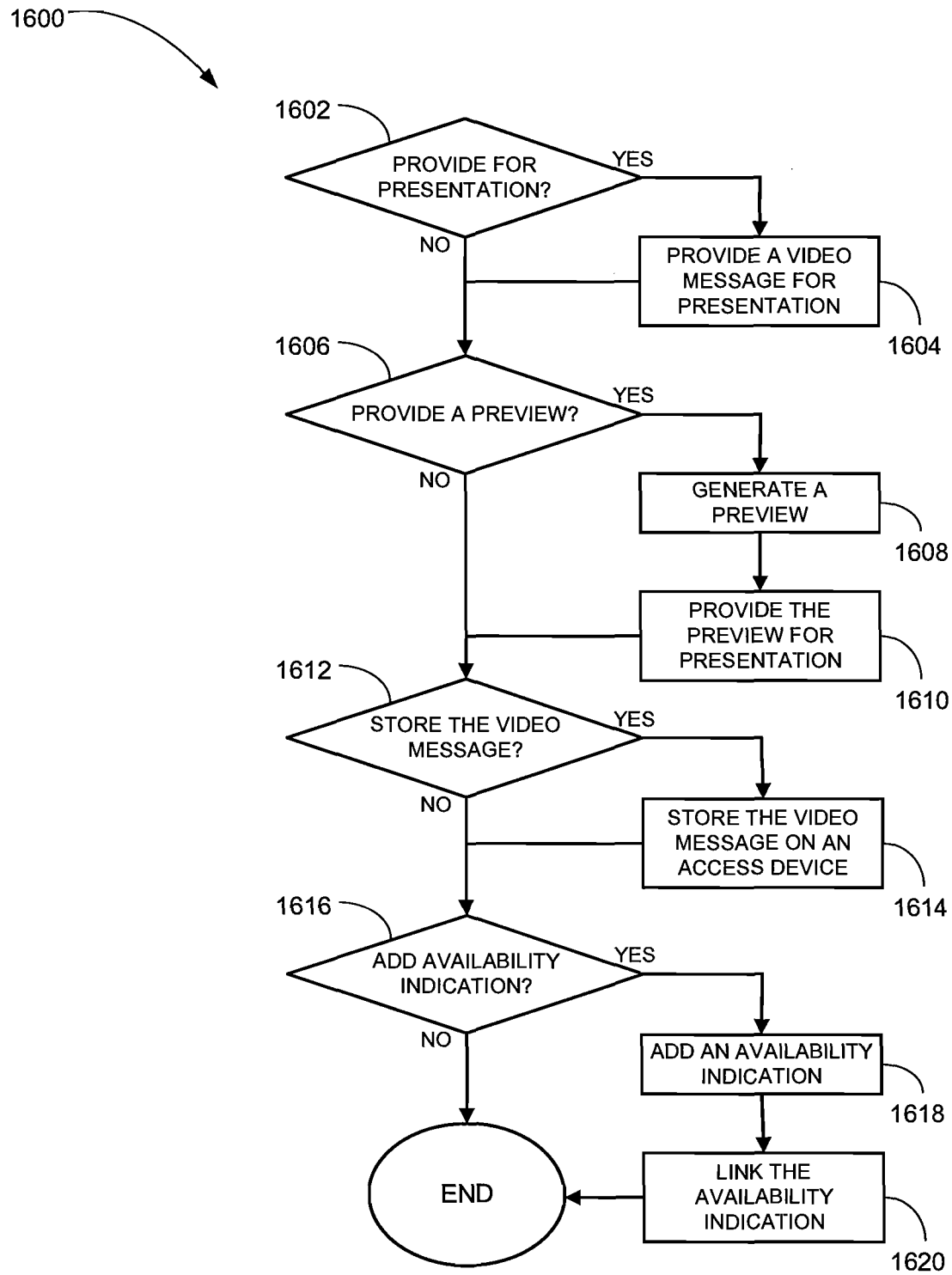
FIG. 16 is a flowchart illustrating a method for message unitization in accordance with an example embodiment.

FIG. 16 illustrates a method 1600 for message utilization according to an example embodiment. The method 1600 may be performed at block 1520 (see FIG. 15) or otherwise performed.

A determination may be made at decision block 1602 whether to provide a video message for presentation. If a determination is made to provide the video message for presentation, the video message may be provided for presentation at block 1604. If a determination is made not to provide the video message for presentation at decision block 1602 or upon completion of the operations at block 1604, the method 1600 may proceed to decision block 1606.

At decision block 1606, a determination may be made whether to provide a preview. If a determination is made to provide the preview, a preview of the video message may be generated at block 1608 and the preview may be provided for presentation at block 1610. The preview may include, by way of example, one or more images of the video message or a video clip of the video message. If a determination is made not to provide the preview at decision block 1606 or upon completion of the operations at block 1610, the method 1600 may proceed to decision block 1612.

A determination may be made at decision block 1612 whether to store the video message. If a determination is made to store the video message, the video message may be stored on the target access device 106 at block 1614. If a determination is made not to store the video message at decision block 1612 or upon completion of the operations at block 1614, the method 1600 may proceed to decision block 1616.

At decision block 1616, a determination may be made whether to add an availability indication. If a determination is made to add the availability indication, an availability indication of the video message may be added to a DVR content list at block 1618 and the availability indication may be linked to the video message stored on the access device at block 1620. If a determination is made not to add the availability indication at decision block 1616 or upon completion of the operations at block 1620, the method 1600 may terminate.

In an example embodiment, the operations performed at decision block 1602, decision block 1606, decision block 1612, and decision block 1616 may occur in any order.

Figure 17:
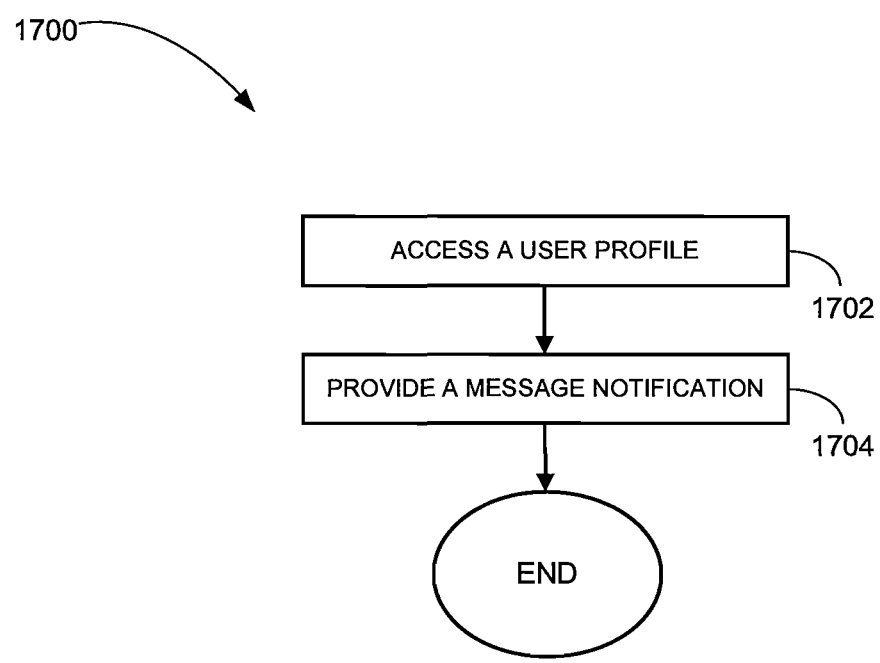
FIG. 17 is a flowchart illustrating a method for notifying in accordance with an example embodiment.

FIG. 17 illustrates a method 1700 for notifying according to an example embodiment. The method 1700 may be performed at block 1502 (see FIG. 15) or otherwise performed.

A user profile associated with a user of the target access device 106 is accessed at block 1702. The user profile may be stored on the target access device 106, the messenger 108, in the database 110, or otherwise stored.

A message notification is provided over the provider network 104 to the additional access device 114 associated with the user in accordance with the user profile.

Figure 18:
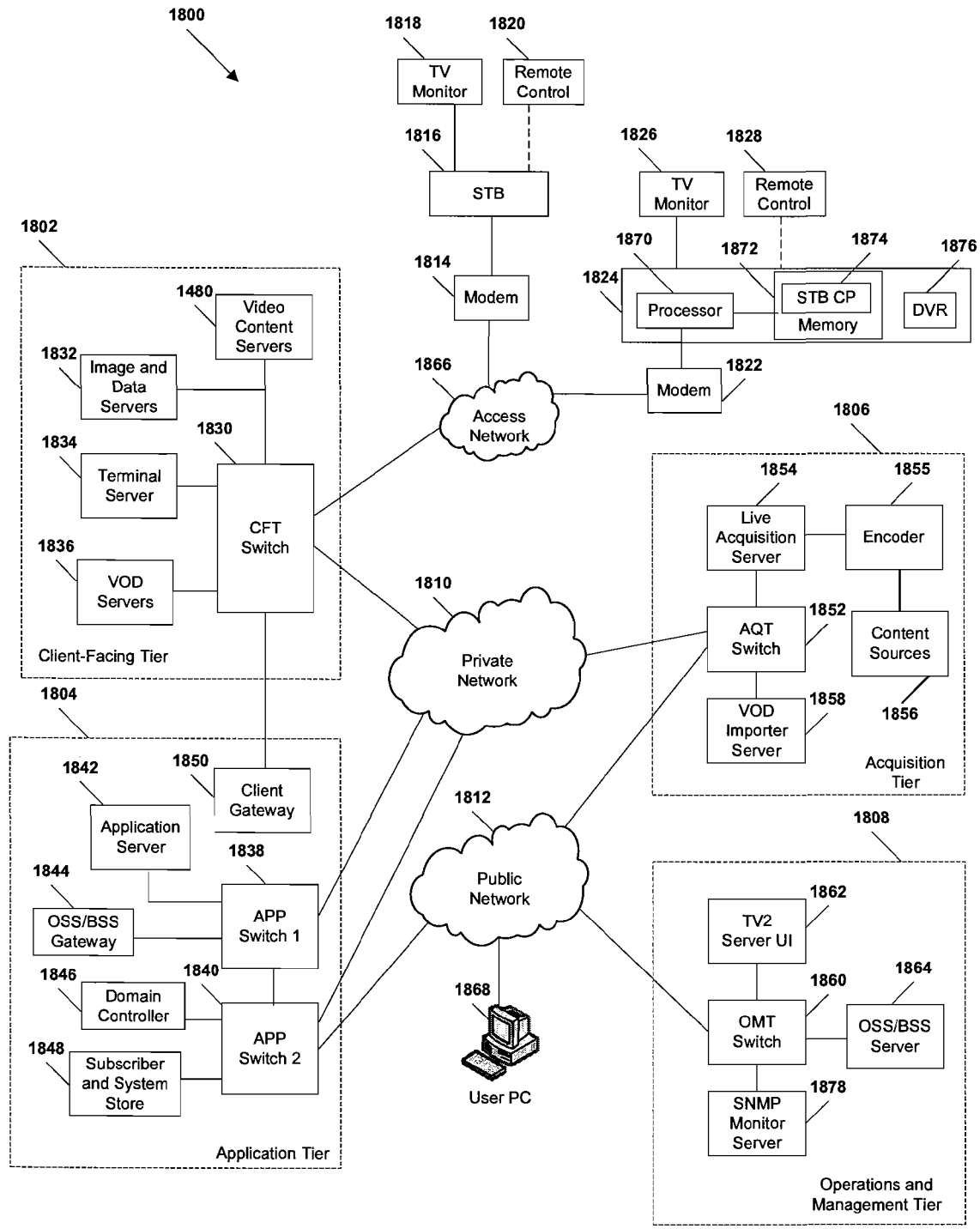
FIG. 18 is a block diagram of an IPTV system in which the content system of FIG. 1 may be deployed in accordance with an example embodiment.

FIG. 18 illustrates an example embodiment of an Internet Protocol Television (IPTV) system 1800 in which the content system 100 may be deployed. However, the content system 100 may be deployed in other types of IPTV and non-IPTV video systems.

The system 1800 as illustrated may include a client facing tier 1802, an application tier 1804, an acquisition tier 1806, and an operations and management tier 1808. Some tiers 1802, 1804, 1806, 1808 may be coupled to a private network 1810; to a public network 1812, such as the Internet; or to both the private network 1810 and the public network 1812. For example, the client-facing tier 1802 may be coupled to the private network 1810. Further, the application tier 1804 may be coupled to the private network 1810 and to the public network 1812. The acquisition tier 1806 may also be coupled to the private network 1810 and to the public network 1812. Additionally, the operations and management tier 1808 may be coupled to the public network 1812.

As illustrated in FIG. 18, some of the various tiers 1802, 1804, 1806, 1808 may communicate with each other via the private network 1810 and the public network 1812. For instance, the client-facing tier 1802 may communicate with the application tier 1804 and the acquisition tier 1806 via the private network 1810. The application tier 1804 may also communicate with the acquisition tier 1806 via the private network 1810. Further, the application tier 1804 may communicate with the acquisition tier 1806 and the operations and management tier 1808 via the public network 1812. Moreover, the acquisition tier 1806 may communicate with the operations and management tier 1808 via the public network 1812. In a particular As illustrated in FIG. 18, the client-facing tier 1802 may communicate with user equipment via a private access network 1866 (e.g., the provider network 104 of FIG. 1), such as an Internet Protocol Television (IPTV) access network. In an illustrative embodiment, modems, such as a first modem 1814 and a second modem 1822 may be coupled to the private access network 1866. The client-facing tier 1802 may communicate with a first representative set-top box device 1816 via the first modem 1814 and with a second representative set-top box device 1824 via the second modem 1822. The client-facing tier 1802 may communicate with a large number of set-top boxes, such as the representative set-top boxes 1816, 1824, (e.g., the access devices 102, 106, 114 of FIG. 1) over a wide geographic area, such as a regional area, a metropolitan area, a viewing area, a designated market area or any other suitable geographic area, market area, or subscriber or customer group that may be supported by networking the client-facing tier 1802 to numerous set-top box devices. In an illustrative embodiment, the client-facing tier, or any portion thereof, may be included at a video head-end office.

In a particular embodiment, the client-facing tier 1802 may be coupled to the modems 1814, 1822 via fiber optic cables. Alternatively, the modems 1814 and 1822 may be digital subscriber line (DSL) modems that are coupled to one or more network nodes via twisted pairs, and the client-facing tier 1802 may be coupled to the network nodes via fiber-optic cables. Each set-top box device 1816, 1824 may process data received via the private access network 1866, via an IPTV software platform, such as Microsoft® TV IPTV Edition. In another embodiment, representative set-top boxes 1816, 1824 may receive data from private access network 1866 through RF and other cable and/or satellite based networks.

Additionally, the first set-top box device 1816 may be coupled to a first external display device, such as a first television monitor 1818, and the second set-top box device 1824 may be coupled to a second external display device, such as a second television monitor 1826. Moreover, the first set-top box device 1816 may communicate with a first remote control 1820, and the second set-top box device may communicate with a second remote control 1828.

In an example, non-limiting embodiment, one or more of set-top box devices 1816, 1824 may receive video content, which may include video and audio portions, from the client-facing tier 1802 via the private access network 1866. The set-top boxes 1816, 1824 may transmit the video content to an external display device, such as the television monitors 1818, 1826. Further, some of the set-top box devices 1816, 1824 may include a STB processor, such as STB processor 1870, and a STB memory device, such as STB memory 1872, which is accessible to the STB processor 1870. In one embodiment, a computer program, such as the STB computer program 1874, may be embedded within the STB memory device 1872. Some set-top box devices 1816, 1824 may also include a video content storage module, such as a digital video recorder (DVR) 1876. In a particular embodiment, the set-top box devices 1816, 1824 may communicate commands received from the remote control devices 1820, 1828 to the client-facing tier 1802 via the private access network 1866.

In an illustrative embodiment, the client-facing tier 1802 may include a client-facing tier (CFT) switch 1830 that manages communication between the client-facing tier 1802 and the private access network 1866 and between the client-facing tier 1802 and the private network 1810. As shown, the CFT switch 1830 is coupled to one or more image and data servers 1832 that store still images associated with programs of various IPTV channels. The image and data servers 1832 may also store data related to various channels, e.g., types of data related to the channels and to programs or video content displayed via the channels. In an illustrative embodiment, the image and data servers 1832 may be a cluster of servers, some of which may store still images, channel and program-related data, or any combination thereof. The CFT switch 1830 may also be coupled to a terminal server 1834 that provides terminal devices with a connection point to the private network 1810. In a particular embodiment, the CFT switch 1830 may also be coupled to one or more video-on-demand (VOD) servers 1836 that store or provide VOD content imported by the IPTV system 1800. In an illustrative, non-limiting embodiment, the VOD content servers 1880 may include one or more unicast servers.

The client-facing tier 1802 may also include one or more video content servers 1880 that transmit video content requested by viewers via their set-top boxes 1816, 1824. In an illustrative, non-limiting embodiment, the video content servers 1880 may include one or more multicast servers.

As illustrated in FIG. 18, the application tier 1804 may communicate with both the private network 1810 and the public network 1812. The application tier 1804 may include a first application tier (APP) switch 1838 and a second APP switch 1840. In a particular embodiment, the first APP switch 1838 may be coupled to the second APP switch 1840. The first APP switch 1838 may be coupled to an application server 1842 and to an OSS/BSS gateway 1844. In a particular embodiment, the application server 1842 may provide applications to the set-top box devices 1816, 1824 via the private access network 1866, which enable the set-top box devices 1816, 1824 to provide functions, such as display, messaging, processing of IPTV data and VOD material, etc. In a particular embodiment, the OSS/BSS gateway 1844 includes operation systems and support (OSS) data, as well as billing systems and support (BSS) data. In one embodiment, the OSS/BSS gateway may provide or restrict access to an OSS/BSS server 1864 that stores operations and billing systems data.

Further, the second APP switch 1840 may be coupled to a domain controller 1846 that provides web access, for example, to users via the public network 1812. For example, the domain controller 1846 may provide remote web access to IPTV account information via the public network 1812, which users may access using their personal computers 1868. The second APP switch 1840 may be coupled to a subscriber and system store 1848 that includes account information, such as account information that is associated with users who access the system 1800 via the private network 1810 or the public network 1812. In a particular embodiment, the application tier 1804 may also include a client gateway 1850 that communicates data directly with the client-facing tier 1802. In this embodiment, the client gateway 1850 may be coupled directly to the CFT switch 1830. The client gateway 1850 may provide user access to the private network 1810 and the tiers coupled thereto.

In a particular embodiment, the set-top box devices 1816, 1824 may access the IPTV system 1800 via the private access network 1866, using information received from the client gateway 1850. In this embodiment, the private access network 1866 may provide security for the private network 1810. User devices may access the client gateway 1850 via the private access network 1866, and the client gateway 1850 may allow such devices to access the private network 1810 once the devices are authenticated or verified. Similarly, the client gateway 1850 may prevent unauthorized devices, such as hacker computers or stolen set-top box devices from accessing the private network 1810, by denying access to these devices beyond the private access network 1866.

For example, when the first representative set-top box device 1816 accesses the system 1800 via the private access network 1866, the client gateway 1850 may verify subscriber information by communicating with the subscriber and system store 1848 via the private network 1810, the first APP switch 1838, and the second APP switch 1840. Further, the client gateway 1850 may verify billing information and status by communicating with the OSS/BSS gateway 1844 via the private network 1810 and the first APP switch 1838. In one embodiment, the OSS/BSS gateway 1844 may transmit a query across the first APP switch 1838, to the second APP switch 1840, and the second APP switch 1840 may communicate the query across the public network 1812 to the OSS/BSS server 1864. After the client gateway 1850 confirms subscriber and/or billing information, the client gateway 1850 may allow the set-top box device 1816 access to IPTV content and VOD content. If the client gateway 1850 is unable to verify subscriber information for the set-top box device 1816, e.g., because it is connected to an unauthorized twisted pair, the client gateway 1850 may block transmissions to and from the set-top box device 1816 beyond the private access network 1866.

As indicated in FIG. 18, the acquisition tier 1806 includes an acquisition tier (AQT) switch 1852 that communicates with the private network 1810. The AQT switch 1852 may also communicate with the operations and management tier 1808 via the public network 1812. In a particular embodiment, the AQT switch 1852 may be coupled to a live acquisition server 1854 that receives television or movie content, for example, from content sources 1856 through an encoder 1855. In a particular embodiment during operation of the IPTV system, the live acquisition server 1854 may acquire television or movie content. The live acquisition server 1854 may transmit the television or movie content to the AQT switch 1852 and the AQT switch 1852 may transmit the television or movie content to the CFT switch 1830 via the private network 1810.

Further, the television or movie content may be transmitted to the video content servers 1880, where it may be encoded, formatted, stored, or otherwise manipulated and prepared for communication to the set-top box devices 1816, 1824. The CFT switch 1830 may communicate the television or movie content to the modems 1814, 1822 via the private access network 1866. The set-top box devices 1816, 1824 may receive the television or movie content via the modems 1814, 1822, and may transmit the television or movie content to the television monitors 1818, 1826. In an illustrative embodiment, video or audio portions of the television or movie content may be streamed to the set-top box devices 1816, 1824.

Further, the AQT switch may be coupled to a video-on-demand importer server 1858 that stores television or movie content received at the acquisition tier 1806 and communicates the stored content to the VOD server 1836 at the client-facing tier 1802 via the private network 1810. Additionally, at the acquisition tier 1806, the video-on-demand (VOD) importer server 1858 may receive content from one or more VOD sources outside the IPTV system 1800, such as movie studios and programmers of non-live content. The VOD importer server 1858 may transmit the VOD content to the AQT switch 1852, and the AQT switch 1852, in turn, may communicate the material to the CFT switch 1830 via the private network 1810. The VOD content may be stored at one or more servers, such as the VOD server 1836.

When user issue requests for VOD content via the set-top box devices 1816, 1824, the requests may be transmitted over the private access network 1866 to the VOD server 1836, via the CFT switch 1830. Upon receiving such requests, the VOD server 1836 may retrieve the requested VOD content and transmit the content to the set-top box devices 1816, 1824 across the private access network 1866, via the CFT switch 1830. The set-top box devices 1816, 1824 may transmit the VOD content to the television monitors 1818, 1826. In an illustrative embodiment, video or audio portions of VOD content may be streamed to the set-top box devices 1816, 1824.

FIG. 18 further illustrates that the operations and management tier 1808 may include an operations and management tier (OMT) switch 1860 that conducts communication between the operations and management tier 1808 and the public network 1812. In the embodiment illustrated by FIG. 18, the OMT switch 1860 is coupled to a TV2 server 1862. Additionally, the OMT switch 1860 may be coupled to an OSS/BSS server 1864 and to a simple network management protocol (SNMP) monitor 1878 that monitors network devices within or coupled to the IPTV system 1800. In a particular embodiment, the OMT switch 1860 may communicate with the AQT switch 1852 via the public network 1812.

In an illustrative embodiment, the live acquisition server 1854 may transmit the television or movie content to the AQT switch 1852, and the AQT switch 1852, in turn, may transmit the television or movie content to the OMT switch 1860 via the public network 1812. In this embodiment, the OMT switch 1860 may transmit the television or movie content to the TV2 server 1862 for display to users accessing the user interface at the TV2 server 1862. For example, a user may access the TV2 server 1862 using a personal computer (PC) 1868 coupled to the public network 1812.

Figure 19:
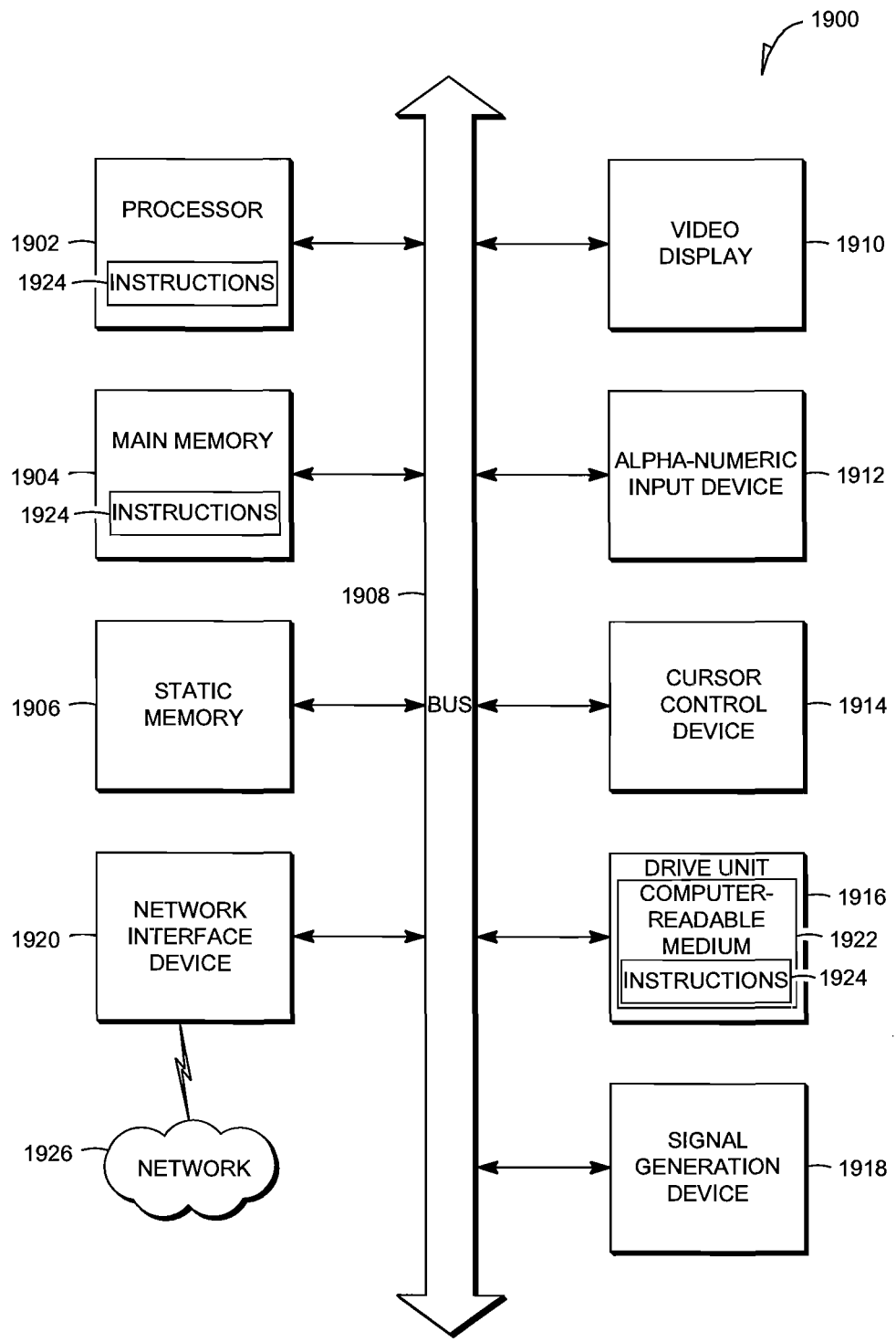
FIG. 19 illustrates a diagrammatic representation of a machine in the example form of a computer system within which a set of instructions for causing the machine to perform any one or more of the methodologies discussed herein may be executed.

FIG. 19 shows a diagrammatic representation of machine in the example form of a computer system 1900 within which a set of instructions may be executed causing the machine to perform any one or more of the methods, processes, operations, or methodologies discussed herein. The messenger 108 may be deployed on the computer system 1900. The access devices 102, 106, 114, 300 may include the functionality of the computer system 1900.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1900 includes a processor 1902 (e.g., a central processing unit (CPU) a graphics processing unit (GPU) or both), a main memory 1904 and a static memory 1906, which communicate with each other via a bus 1908. The computer system 1900 may further include a video display unit 1910 (e.g., a liquid crystal display (LCD) or a cathode ray tube (CRT)). The computer system 1900 also includes an alphanumeric input device 1912 (e.g., a keyboard), a cursor control device 1914 (e.g., a mouse), a drive unit 1916, a signal generation device 1918 (e.g., a speaker) and a network interface device 1920.

The drive unit 1916 includes a machine-readable medium 1922 on which is stored one or more sets of instructions (e.g., software 1924) embodying any one or more of the methodologies or functions described herein. The software 1924 may also reside, completely or at least partially, within the main memory 1904 and/or within the processor 1902 during execution thereof by the computer system 1900, the main memory 1904 and the processor 1902 also constituting machine-readable media.

The software 1924 may further be transmitted or received over a network 1926 via the network interface device 1920.

While the machine-readable medium 1922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies shown in the various embodiments of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for message notification have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving, by a system comprising a processor, an authorization request from a source access device;
verifying, by the system, that a sender associated with the source access device has sufficient credit in an existing subscriber account to upload a video message;
authorizing, by the system, the source access device to upload the video message;
receiving, by the system, an upload of the video message from the source access device;
adjusting, by the system, credit in the existing subscriber account of the sender based on the upload of the video message;
receiving, by the system, a designation of a target user for the video message; and
providing, by the system, a message notification to the target user of availability of the video message for a target access device associated with the target user while maintaining the video message for delivery.

2. The method of claim 1, further comprising:
providing an authorization to the source access device;
wherein the receiving of the video message is in accordance with the providing of the authorization.

3. The method of claim 1, further comprising:
verifying that the target user has sufficient credit to access the video message, wherein the credit is associated with a subscription level and wherein the credit is for video messages of a certain size;
providing the target user with access to the video message; and adjusting credit of the target user based on the access to the video message.

4. The method of claim 1, further comprising providing the video message to the target user.

5. The method of claim 4, wherein the providing of the video message comprises:
receiving a message viewing request from the target user of the message notification; and
streaming the video message for viewing with the target access device.

6. The method of claim 5, further comprising:
accessing a user profile associated with the target user of the target access device, the user profile including a device selection of the target access device from a plurality of access devices associated with the target user; and
wherein the message notification is provided to the target access device in accordance with the user profile.

7. A method comprising:
receiving, by a system comprising a processor, a selection of a selected video message;
verifying, by the system, that a sender has sufficient credit in an existing subscriber account to upload the selected video message;
uploading, by the system, the selected video message to a messenger;
adjusting, by the system, credit in the existing subscriber account of the sender based on the unload of the selected video message;
receiving, by the system, a designation of a target user for the selected video message from a sender; and
providing, by the system, a message notification of availability of the selected video message for an access device associated with the target user.

8. The method of claim 7, further comprising:
providing an authorization request to authorize the sender to upload the selected video message; and
receiving an authorization confirmation in response to the authorization request;
wherein the uploading of the selected video message to the messenger is based on the receiving of the authorization confirmation.

9. The method of claim 7, further comprising:
providing a verification request to verify that a sender has sufficient credit to upload the selected video message; and
receiving a payment verification in response to the verification request;
wherein the uploading of the selected video message to the messenger is based on the payment verification.

10. The method of claim 7, wherein the access device includes a set-top box.

11. A method comprising:
receiving, by a system comprising a processor, a message notification associated with a video message on an access device;
verifying, by the system, that a sender of the video message has sufficient credit in an existing subscriber account to upload the video message;
providing, by the system, a plurality of viewing selections associated with the video message for selection through the access device;
accessing, by the system, a selected viewing selection of the plurality of viewing selections for the video message;
providing, by the system, a message viewing request to a messenger device based on the the selected viewing selection; and
receiving, by the system, the video message from the messenger device in response to the providing of the message viewing request.

12. The method of claim 11, wherein the providing of the plurality of viewing selections further comprises:
determining whether the video message contains restricted content;
wherein the providing of the plurality of viewing selections is in accordance with the determining of the restricted content.

13. The method of claim 11, wherein the providing of the plurality of viewing selections further comprises:
verifying that the sender of the video message is on an approved senders list associated with a target user;
wherein the providing of the plurality of viewing selections is in accordance with the verifying of the sender.

14. The method of claim 11, wherein the providing of the plurality of viewing selections further comprises:
notifying an additional user regarding the message notification;
receiving a sender authorization from the additional user;
wherein the providing of the plurality of viewing selections is in accordance with the receiving of the sender authorization.

15. The method of claim 11, further comprising:
storing the selected viewing selection on the access device.

16. The method of claim 11, further comprising:
providing the video message for presentation.

17. The method of claim 11, further comprising:
generating a preview of the video message;
providing the preview of the video message for presentation.

18. The method of claim 11, further comprising:
storing the video message on the access device.

19. The method of claim 11, further comprising:
providing a user indication on the access device of the receiving of the message notification.

20. The method of claim 11, further comprising:
accessing a user profile associated with a user of the access device; and
providing the message notification over a network to an additional access device associated with the user in accordance with the user profile.

21. The method of claim 11, further comprising:
providing a verification request to verify that a target user has sufficient credit to receive the video message; and
receiving a payment verification in response to the verification request;
wherein the providing of the message viewing request to the messenger is based on the payment verification.

22. A machine-readable medium comprising instructions, wherein responsive to executing the instructions, a processor performs operations comprising:
receiving a video message from a source access device;
verifying that a sender of the video message has sufficient credit in an existing subscriber account to upload the video message;
receiving a selection of a target user for the video message; and
providing a message notification of availability of the video message for a target access device associated with the target user while maintaining the video message for delivery.

23. The machine-readable medium of claim 22, wherein the providing the message notification of availability of the video message further comprises:

receiving a message viewing request from the target user of the message notification; and streaming the video message for viewing.

24. A system comprising a memory to store instructions; and a controller coupled to the memory, wherein responsive to executing the instructions the controller performs operations comprising:

receiving a selection of a selected video message;

verifying that a sender of the selected video message has sufficient credit in an existing subscriber account to upload the video message;

uploading the selected video message to a messenger device;

receiving a selection of a target user for consuming the selected video message; and providing a message notification of availability of the selected video message for an access device associated with the target user.

25. The system of claim 24, wherein the operations further comprise:

receiving the message notification associated with the selected video message;

providing a plurality of viewing selections associated with the video message for presentation;

accessing a viewing selection of the plurality of viewing selections for the video message;

providing a message viewing request to the messenger device based on the receiving of the viewing selection; and a message receiver module to receive the video message from the messenger device.

\* \* \* \* \*